April 22, 1930.   J. BIJUR   1,755,627
LUBRICATION OF BEARINGS ON PIVOTED STRUCTURES
Filed July 2, 1927
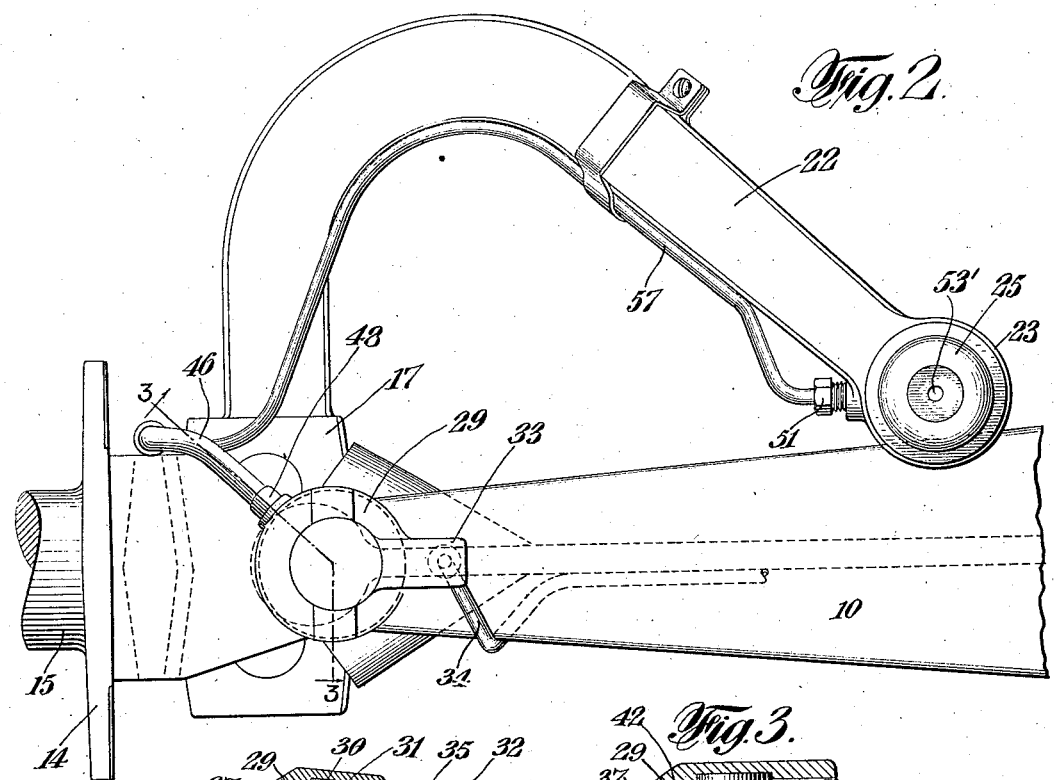
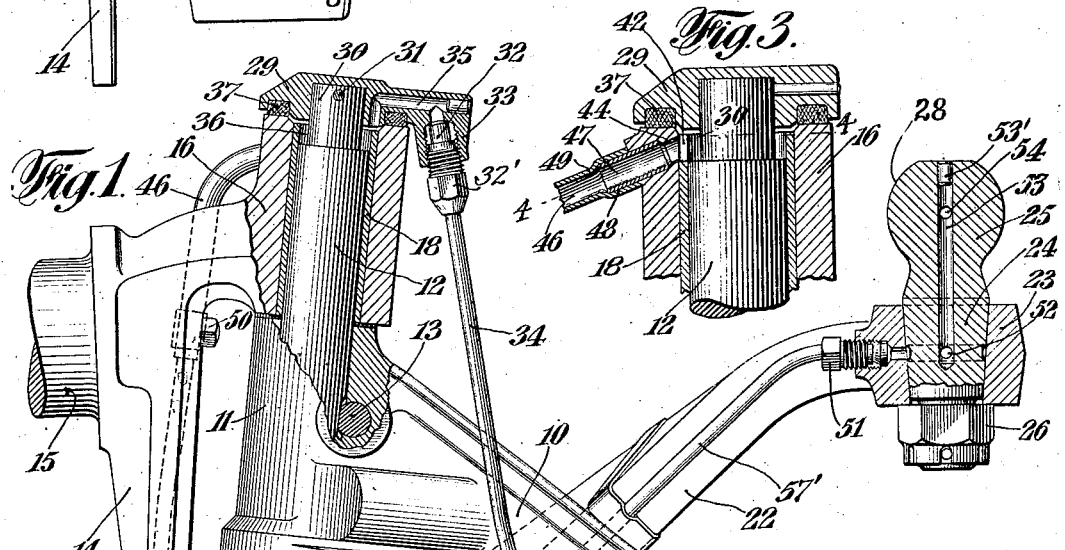
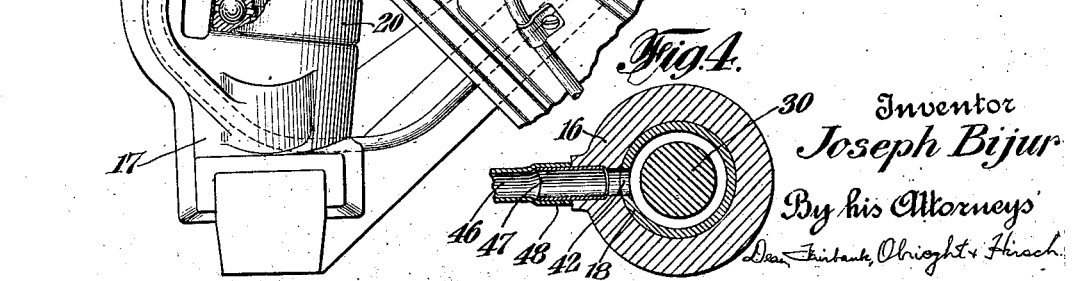
Inventor
Joseph Bijur
By his Attorneys Patented Apr. 22, 1930

1,755,627

UNITED STATES PATENT OFFICE

JOSEPH BIJUR, OF NEW YORK, N. Y., ASSIGNOR TO AUTO RESEARCH CORPORATION, A CORPORATION OF DELAWARE

LUBRICATION OF BEARINGS ON PIVOTED STRUCTURES

Application filed July 2, 1927. Serial No. 202,996.

While certain of the features of my present invention are applicable to gravity flow systems broadly, the invention has a preferred use in association with pressure lubricating systems and more especially for delivering lubricant by gravity flow or displacement from a pressure line to a bearing of a structure having a swiveled or other movable relation with respect to the main lubricated structure, more especially where it is unfeasible or undesirable to convey the lubricant under pressure past or across such swivel or other connection.

In common with my copending application Serial No. 202,995, filed concurrently herewith, the present invention relates to the delivery of lubricant from a central source of pressure, past a swivel to a bearing carried on a relatively movable structure, and specifically to lubricating a bearing on a steering knuckle from a source of lubricant on the vehicle frame or axle. The present invention is concerned with certain simplifications in the combination claimed in my said copending application, which are rendered feasible where the bearing to be lubricated is at level higher than the contiguous part of the conduit supplying the same.

The invention is specifically applicable to the drag link arms of steering knuckles which in general are inclined or curved upward from the pivoting part of the knuckle and are provided with upwardly extending ball stud bearings.

The present invention in its special field of application, in common with that of my above mentioned copending application, has among its objects to avoid leak of lubricant at the swivel mount of the knuckle or analogous part, without introducing any loose or flapping conduits to bridge across the swivel, yet to assure the prompt delivery of the lubricant, free from foreign matter to the bearing on the pivoted structure, without impairing the efficacy of the pressure system in prompt delivery of lubricant to other bearings.

As in said copending application, the drip plug or other pressure absorbing terminal of the supply line is located in advance of the swivel mount of the steering knuckle and the conduit arranged on the knuckle for flow of the lubricant to the bearings by simple gravity flow or displacement.

A special difficulty encountered in the case of a gravity flow conduit of the specific character here involved extending in whole or in part at level below the outlet therefrom to the bearing, so that oil would normally be trapped therein, is that because of the blocking effect of the air in advance of the trapped column, a charge of oil admitted thereto might not promptly flow down thereto.

By the simple expedient of making the inlet length, which is above the level of the trapped oil in the dropping line, of bore sufficiently large to permit flow of lubricant about the air therein, the air blocking effect is obviated and the admitted lubricant promptly flows down through the pipe and settles on top of the trapped lubricant, causing a corresponding charge to escape through the opposite end thereof into the bearing. Inasmuch as the oil is not advanced through the substantial length of pipe in which the latter is trapped, and air and oil are not required to pass each other, the bore of the trapping length of pipe is made of very small diameter.

In the accompanying drawings in which is shown one of various possible embodiments of the several features of the invention, Fig. 1 is a fragmentary view partly in section of a knuckle embodying my invention, Fig. 2 is a plan view thereof, Fig. 3 is a fragmentary section taken on line 3—3 of Fig. 2, and Fig. 4 is a fragmentary section taken on line 4—4 of Fig. 3.

In the drawings is shown a fragmentary view of a steering knuckle installation, illustratively of the reverse Elliott type, which comprises an axle end 10 having an eye 11 through which extends a king pin 12 pinned rigidly to the axle by the key 13. The bearing ends of the king pin are straddled by the clevis jaws 16 and 17 of a knuckler 14 having a wheel spindle 15, said jaws having bushings 18 therein providing bearing surfaces for the upper and lower ends respectively of the king pin. In the embodiment shown, the axle has a thrust ball bearing 20 sustained on the lower of the knuckle clevises. The knuckle shown has rigid therewith an upwardly inclined arm 22 provided with a tapered socket 23, at its outer end, in which is fitted the correspondingly tapered shank 24 of an upwardly extending ball stud 25 which provides a swivel bearing at its upper end for the corresponding socket (not shown) of the rod or link associated therewith. The ball stud 25 is secured in place by an appropriate nut 26 threaded on the lower end thereof. Arm 22 may be a special construction of tie rod arm or a more or less conventional construction of drag link arm. In the latter case, the knuckle would also have a tie rod arm, but this is not shown, as the lubrication of the common arrangement of tie rod arm is the subject matter of my copending application above referred to and the lubrication of both tie rod and drag link arms concurrently is the subject matter of another application Serial No. 202,997, filed concurrently herewith.

To lubricate the knuckle, I have provided a lubricant inlet cap 29 having a central socket within which fits the reduced uppermost end 30 of the king pin which is made to protrude above the upper end of the upper clevis jaw 16. A cross pin 31 serves to key the cap to the king pin end, so that the cap is accordingly held rigid with the axle.

The lubricant is admitted to the cap 29 preferably through an appropriate flow controlling fitting 32 which is retained by bushing 32' threaded into the lower face of an integral lug 33 of the cap that protrudes laterally toward the axle side thereof, which in this embodiment is illustratively in turn, supplied through a pipe 34 along the axle. The lubricant is supplied under pressure from a source (not shown) on the vehicle frame to the control fitting, which may be a drip plug and in which the pressure is preferably absorbed so that lubricant passes therebeyond to the knuckle at a measured rate.

The supply cap is bored as at 35 to drip into an annular well 36 formed about the king pin and encircled by the upper part of the bushing 18 over the upper king pin bearing.

In order to prevent dust and dirt from entering through the gap between the stationary cap 29 and the rocking or oscillating, upper clevis 16, I have provided the construction shown, in which an annular compression gasket 37 is lodged in a corresponding annular groove in the cap 29. The gasket is of thickness such that it is compressed when the pin 31 is applied to secure the inlet cap to the king pin.

The bearing 28 on arm 22 is supplied with lubricant from the well 36 through a notch 42 in the upper end of the bushing 18, the bottom of said notch being flush with the bottom of the downwardly inclined outlet bore 44 in the upper knuckle clevis 16. The conduit for supplying the bearing 28 comprises a length of pipe 46, the upper end of which is connected to the oblique bore 44. For convenience of connection, a short attachment tube 47 is preferably fitted in a corresponding enlargement of bore 44 in the upper knuckle and the upper end of pipe 46 is enlarged as at 48 to encircle the protruding end of tube 47, affording a shoulder 49 abutting the end of said tube. The lubricant passing by gravity to and through pipe 46, the joint will transmit without leak.

The construction just described by which the upper end of the knuckle conduit is affixed to the upper clevis is claimed in my co-pending application Ser. No. 429,539, filed February 19, 1930.

The length of pipe 46 extends generally downward along the structure of the knuckle, to which it is clipped as at 50, and along the length of the arm 22 to the eye 23 in which the ball stud 25 is mounted, a pipe coupling terminal fitting 51 serving to affix the outlet end of the pipe in said eye. Ball stud 25 is supplied from the pipe by a radial bore 52 communicating with an axial bore 53 plugged at its upper end at 53' and which delivers through radial bores 54 in the stud 25.

Inasmuch as lubricant is trapped in the upwardly inclined pipe 57' and the ball stud 25, and, therefore, blocks the escape of air through the length of said pipe, the difficulty may arise that air at the inlet end of the piping above the level of lubricant in pipe 57, may block the entry of lubricant to be admitted and thereby interfere with the oiling of the steering arm bearing.

To obviate such air blocking, the pipe 46 leading to the steering arm is made of relatively large bore, $\frac{3}{16}$ inch or greater in diameter, where engine oil is used.

Thus, the lubricant admitted to pipe 46 will readily flow without air blocking, down through the large bore 46 thereof to combine with the lubricant trapped therebelow. As a consequence of the addition of lubricant at the inlet end of the pipe, lubricant will overflow through the outlet port 54 to the bearing (not shown).

It is desired in general, although this is not necessary, to use the smallest pipe consistent with operativeness. Accordingly, as shown in the drawings, the parts of the pipe 57' below the ports 54 may be of small diameter, for instance, $\frac{1}{8}$ inch internal bore, inasmuch as lubricant trapped and filling said part of the pipe precludes air blocking. No air blocking will occur in first applying lubricant to the new or dry equipment, since the lubricant once entering the small pipe will cause the air in advance thereof to pass on outward at the bearing end.

In operation, upon application of pressure at the central source, from which the knuckle bearings are supplied with lubricant, the drip plug will slowly deliver say a dozen drops of lubricant, which will drip through port 35 into well 36.

Such lubricant settles in the well 36 from which a little will seep directly to the upper king pin bushing 18 to lubricate the latter. The bulk of the lubricant will drain off through the pipe 46 to the bearing stud 25.

It will be seen that the conduit is rigidly sustained along the structural parts of the knuckle and in non-flapping relationship with respect thereto and is inherently protected preferably by being arranged on the rear and protected side of the arm, so that it is unlikely to be injured in use.

The invention though shown embodied in a knuckle of the reverse Elliott type is generally claimed to embrace its application also to knuckles of the Elliott type. Such latter application is shown and specifically claimed in my copending application, Serial No. 56,435, filed September 15, 1925.

While the invention has a preferred application to the lubrication of steering knuckles, it will be understood that certain of the broader features thereof are of more general application in other relations, and more especially in relations in which it is desired to lubricate by gravity or displacement flow from a remote source, a bearing at level higher than part of the conduit leading thereto.

I claim:—

1. In a liquid distributing system, the combination of a conduit having a portion intermediate its ends at a level lower than both its inlet and its outlet, the inlet end of said conduit extending to a level higher than the outlet, the length of said inlet portion above the level of said outlet having a bore sufficiently large to permit downward passage of liquid around the air therein.

2. In a mechanism including a bearing stud displaceable in the course of operation, means for lubricating the same from a convenient source, said means comprising a lubricant inlet carried by the mechanism and performing a motion of less magnitude than that of said stud, a conduit extending from said inlet to said stud, said stud extending to a level higher than part of said conduit and having one or more bores therethrough for delivering lubricant from said conduit to the bearing surface, the inlet end of said pipe down to a level no higher than that of said stud being of diameter sufficiently large to prevent air lock.

3. In a chassis lubricating system, the combination of a steering knuckle having an arm rigid therewith upwardly inclined at its outer end and provided thereat with a bearing, and means for supplying lubricant by gravity flow to said bearing, said means comprising a conduit extending from the upper part of the king pin along the knuckle and along said arm to the bearing, the part of said conduit above the level of lubricant trapped in the downwardly curved conduit which extends along the arm having a bore of cross-sectional area sufficient to permit passage of lubricant around any air therein.

4. A steering knuckle having an arm, connected thereto near the lower end thereof, inclined upward at its outer part and having a bearing at its extremity, means for supplying said bearing from an inlet nearer the pivot mount of said knuckle, said means comprising a first conduit part rigid with said knuckle, and of relatively large bore and having its lower end at a level below that of said bearing and a pipe connected to the lower end of said conduit and extending along the length of said arm to the bearing thereof, whereby in the admission of lubricant at said conduit part, air lock with respect to the lubricant trapped along the length of said arm will be precluded.

5. The combination of a movable outlet, a fixed inlet for supplying lubricant to said outlet, means movable with said outlet and in flow intercepting relationship with respect to said fixed inlet, and constituting a passage the inlet part of which is of relatively larger diameter and extends from a level higher than said outlet to a level at least as low as that of said outlet and delivering to a conduit part of smaller diameter, extending from below said outlet, upward to said outlet.

6. In a lubricating installation, the combination of a mechanical structure including an oscillatable arm having a bearing at its outer end at a level higher than another part of said arm, a lubricant conduit extending along said arm to said bearing, and having a bore of cross-section so small as to prevent advance of lubricant therethrough about any air therein, the inlet end of said pipe being at a level lower than said bearing, and supply conduit means leading to said pipe from a level higher than said bearing, said supply conduit being of diameter sufficiently large to permit concurrent movement of lubricant and air therethrough in opposite directions.

7. In a steering knuckle, the combination of a steering arm having a drag link bearing at its outer end and having a part of the length thereof below said bearing, means for supplying said bearing from an inlet nearer the pivot mount of said knuckle, said means comprising a conduit part rigid with said knuckle and of diameter sufficiently large to permit simultaneous flow therein of air and lubricant in opposite directions and a pipe connected to the lower end of said conduit part and extending along the length of said steering arm to the bearing thereof, said pipe of diameter too small to permit lubricant to pass around any air therein, whereby in the admission of lubricant at said conduit part, air lock with respect to the lubricant trapped along the length of said steering arm will be precluded.

8. Means for lubricating a bearing stud carried by an arm of the steering knuckle of a motor vehicle, said means comprising a pipe carried by said knuckle, said pipe having a portion of larger diameter extending downward to a level at least as low as that of said bearing and delivering into a second conduit of smaller diameter extending lengthwise along said arm below said stud, said stud having a bore of diameter at least as small as that of said pipe and supplied from said conduit.

9. In a motor vehicle of the type including an axle, a knuckle, a king pin constituting a pivot mount for said knuckle, and a steering arm rigid with said knuckle having an upwardly extending outer part and a drag link bearing rigid with the extremity thereof; the combination therewith of means for lubricating said drag link bearing, said means comprising a lubricant inlet fixed with respect to said axle, and a conduit carried by said knuckle and having a part near the upper end of the king pin in flow-intercepting relationship with respect to said inlet, said conduit having a portion of diameter sufficiently large to permit the flow of lubricant around the air therein and extending downward to a level at least as low as that of said bearing, the rest of said conduit constituting a length of pipe of diameter smaller than that required for passage of lubricant around air therein, said pipe of smaller diameter extending along the length of said steering arm outward to said bearing.

10. In a liquid distributing system, the combination of a conduit having an inlet and outlet laterally displaced, said inlet at level higher than said outlet, the length of said inlet portion above the level of said outlet having a bore sufficiently large to permit passage of liquid around the air therein.

Signed at New York city, in the county of New York and State of New York, this 15th day of June A. D. 1927.

JOSEPH BIJUR.